US011124043B2

(12) United States Patent
Favaretto

(10) Patent No.: US 11,124,043 B2
(45) Date of Patent: Sep. 21, 2021

(54) SPORTS CAR PROVIDED WITH A CONDITIONING SYSTEM

(71) Applicant: FERRARI S.p.A., Modena (IT)

(72) Inventor: Fabrizio Favaretto, Formigine (IT)

(73) Assignee: FERRARI S.p.A., Modena (IT)

(*) Notice: Subject to any disclaimer, the term of this patent is extended or adjusted under 35 U.S.C. 154(b) by 27 days.

(21) Appl. No.: 16/434,437

(22) Filed: Jun. 7, 2019

(65) Prior Publication Data
US 2019/0375269 A1 Dec. 12, 2019

(30) Foreign Application Priority Data

Jun. 11, 2018 (IT) .......................... 102018000006196
Jun. 11, 2018 (IT) .......................... 102018000006197
Jun. 11, 2018 (IT) .......................... 102018000006203
Jun. 11, 2018 (IT) .......................... 102018000006204

(51) Int. Cl.
B60H 1/00 (2006.01)

(52) U.S. Cl.
CPC ..... *B60H 1/00392* (2013.01); *B60H 1/00207* (2013.01); *B60H 1/00564* (2013.01); *B60H 2001/00235* (2013.01)

(58) Field of Classification Search
CPC ............ B60H 1/00021; B60H 1/00028; B60H 2001/00085; B60H 2001/00185; B60H 2001/00192; B60H 1/00207; B60H 2001/00221; B60H 2001/00235; B60H 1/00564; B60H 1/3414; B62D 25/04; B60J 1/008; B60J 1/06; B60J 1/02
USPC ............. 165/44, 202, 204; 296/193.06, 84.1, 296/96.21
See application file for complete search history.

(56) References Cited

U.S. PATENT DOCUMENTS

| 3,232,660 | A | * | 2/1966 | Barenyi | ................. | B60H 1/245 454/137 |
| 3,278,121 | A | | 10/1966 | Komenda | | |
| 4,807,523 | A | * | 2/1989 | Radtke | .................... | B60H 1/245 454/137 |
| 6,878,054 | B2 | * | 4/2005 | Klesing | ................. | B60H 1/262 454/129 |
| 7,494,178 | B2 | * | 2/2009 | Nygaard | ................. | B60R 21/13 180/274 |
| 2001/0029162 | A1 | * | 10/2001 | Yoshinori | ............. | B60H 1/247 454/137 |

(Continued)

FOREIGN PATENT DOCUMENTS

DE 102007029859 A1 1/2009
EP 0673796 A1 9/1995

(Continued)

OTHER PUBLICATIONS

Search Report issued in Italian Application No. 201800006196, completed Mar. 26, 2019; 9 pages.

(Continued)

*Primary Examiner* — Frantz F Jules
*Assistant Examiner* — Jason N Thompson
(74) *Attorney, Agent, or Firm* — Cantor Colburn LLP

(57) ABSTRACT

A sports car provided with a conditioning system comprising a conditioning device for treating environmental air, an internal channel for delivering conditioned air generated by said conditioning device throughout a vehicle cockpit, wherein said conditioning device is arranged at the rear of said vehicle cockpit.

17 Claims, 8 Drawing Sheets

(56) References Cited

U.S. PATENT DOCUMENTS

| | | | |
|---|---|---|---|
| 2004/0093883 A1 | 5/2004 | Nakagawa et al. | |
| 2005/0087332 A1* | 4/2005 | Umeo | B60H 1/00378 |
| | | | 165/202 |
| 2006/0119705 A1 | 6/2006 | Liao | |
| 2007/0298705 A1 | 12/2007 | Yoshida | |
| 2009/0286459 A1* | 11/2009 | Major | B60H 1/00778 |
| | | | 454/75 |
| 2011/0100034 A1* | 5/2011 | Baker | B60H 1/24 |
| | | | 62/89 |
| 2013/0257106 A1* | 10/2013 | Sawyer | B60H 1/245 |
| | | | 296/208 |
| 2016/0200166 A1* | 7/2016 | Stanek | B60H 1/00657 |
| | | | 165/202 |

FOREIGN PATENT DOCUMENTS

| | | | | |
|---|---|---|---|---|
| GB | 1214719 A | | 12/1970 | |
| GB | 1246803 A | * | 9/1971 | ......... B60H 1/00007 |
| GB | 1246803 A | | 9/1971 | |
| JP | 5983612 U | | 6/1984 | |
| JP | 63242715 A | * | 10/1988 | |

OTHER PUBLICATIONS

Search Report issued in Italian Application No. 201800006197, completed Mar. 21, 2019; 8 pages.
Search Report issued in Italian Application No. 201800006203, completed Mar. 22, 2019; 8 pages.
Search Report issued in Italian Application No. 201800006204, completed Mar. 25, 2019; 8 pages.

* cited by examiner

SPORTS CAR PROVIDED WITH A CONDITIONING SYSTEM

CROSS-REFERENCE TO RELATED APPLICATIONS

This patent application claims priority from Italian patent applications no. 102018000006203, no. 102018000006196, no. 102018000006197 and no. 102018000006204 all filed on Jun. 11, 2018, the entire disclosure of which is incorporated herein by reference.

TECHNICAL FIELD OF THE INVENTION

The invention relates to the field of conditioning systems for sports cars.

STATE OF THE ART

A conditioning system includes a circulation circuit for a carrier fluid, which is properly compressed and expanded in order to transfer heat between two separate environments: the outside and the cockpit of a vehicle. Generally speaking, a conditioning system is indicated with the acronym HVAC (Heating, ventilation, and air conditioning). It comprises channels to suck in air from the outside, treat it, by heating or cooling it, and introduce it into the cockpit of the vehicle.

The HVAC does not necessarily include a compressor for a refrigerant fluid. Indeed, whereas the compressor can be placed anywhere, the HVAC is reached by a pipe, which leads into a radiator, which serves as a condenser of a refrigeration cycle.

When the vehicle is not provided with an internal combustion engine, said radiator can serve as an evaporator, when the refrigerant fluid compressor works as a heat pump, which represents a thermodynamic cycle reversed relative to the refrigeration cycle.

In the vehicles provided with an internal combustion engine, the heating is usually operated by exploiting the heat dissipated by the internal combustion engine, so that the conditioning system a uses a reversed thermodynamic cycle only to carry out the cooling of the cockpit. In electric vehicles, a heat pump is implemented, which is capable of heating and cooling the cockpit in relation to the operating conditions thereof. An example of this implementation is disclosed in EP3173267.

The conditioning device usually is placed close to the cockpit and is a large-sized component.

When manufacturing sports cars, many further aspects need to be taken into account. Sports car are very flattened towards the ground in order to enhance their dynamic qualities. In order to do so, the driving position is very stretched out, with the driver's legs protruding forward. At the same time, a sufficient visibility needs to be ensured to the driver, who must have a sufficient perception of obstacles.

Historically speaking, the conditioning device of the conditioning system of the vehicle has always been placed at the front, approximately above the pedals of the vehicle.

This position has always been considered ideal to ensure an optimal operation of the conditioning system in dispensing air through the outlets made in the dashboard of the vehicle.

This solution, however, is deemed to be unsatisfying.

SUMMARY OF THE INVENTION

The object of the invention is to identify a conditioning system having a layout which is different from the one of the prior art, thus allowing for an improvement of the comfort offered by a sports car.

Another object is to allow designers of sports car to have a greater freedom, so that they can reduce the distance between the front hood of the vehicle and the pedals thereof.

The basic idea of the invention is that of placing the conditioning device, known as HVAC, of the conditioning system of the vehicle at the back of the driver's seat.

According to a preferred variant of the invention, the compressor is placed at a height immediately under the line of sight of the driver. This allows the compressor to be brought closer to the roof of the vehicle, without limiting the rear view of the driver.

As the same time, this allows a battery pack or an internal combustion engine to be installed under the conditioning device.

This turns out be highly advantageous, because the weight of conditioning device is significantly smaller than the weight of a battery pack and even smaller than the weight of an internal combustion engine, which leads to a better distribution of the vehicle weights, which allows the centre of gravity of the car to be low.

According to another preferred variant of the invention, the compressor is arranged behind the headrest, i.e. independently of the line of sight of the driver, and the rear-view mirror is replaced by a display reproducing images captured, in real time, by a video camera associated with a rear part of the vehicle and facing backward. If necessary, the rear window can also be replaced by a display reproducing the same images, so that it can realistically take the place of the rear window of the car. Advantageously, the fact of having the compressor very close to the roof allows the cooling of the cockpit to be directly carried out through the roof of the vehicle by means of an internal air conditioning channel, which is at least partially obtained in the roof.

Therefore, two very distant technical effects can be obtained at the same time: a better distribution of the weights and a shortening of the air ducts from and to the conditioning device.

Since the roof of the cockpit of a sports car is closer to the torso of the occupants than the dashboard, according to preferred variant of the invention, slits are made, which are distributed along the roof on the inner side of the cockpit, thus creating an ideal conditioning of the cockpit, though keeping the air outflow speed low. Furthermore, or alternatively, there can be orientable outlets connected to the roof, on the inner side of the cockpit.

According to a further preferred variant of the invention, which can be combined with any one of the previous variants, the fresh air flowing into the conditioning system is channelled through one or more channels, at least one of them having an outward and forward facing opening, so that the circulation of air is consequent to a forward movement of the sports car. Therefore, a so-called "dynamic air intake" is created, whose flow rate depends, in the absence of any control, on the relative speed between the vehicle and the environmental air.

This aspect becomes extremely advantageous when the car is an electric car. Indeed, a reduction in the aerodynamic efficiency of the vehicle in favour of a natural circulation of the conditioning air of the cockpit is more advantageous than operating an electric fan, especially when the available energy is limited, which is the case in an electric car.

The air flow captured from the outside can preferably be chocked by means of an electrically operated shutter, which evidently absorbs energy only when it is operated in order to carry out an adjustment. Nevertheless, an electric fan is provided in order to ensure a ventilation even when the vehicle is still or travels at a very low speed.

Therefore, according to this preferred variant of the invention, the adjustment of the shutter and the operation of the electric fan are coordinated with one another. The fan preferably supplements the dynamic air intake when the latter is approximately completely open.

Said channel, hereinafter referred to as "external channel", is preferably obtained in the roof of the vehicle. When the distribution of the conditioned air is carried out through the roof of the vehicle, the internal and external channels run parallel to one another along at least a portion of a relative path, which is preferably arranged at the centre of the roof according to a longitudinal development of the vehicle.

Furthermore, the mobile shutter can be manufactured so as to optimize the aerodynamic efficiency of the vehicle when the dynamic intake is completely closed.

In order to prevent water from getting into the cockpit, a suitable separator, known per se, is arranged along the channel connecting the outside to the conditioning system.

The roof of the sports car can be partially removable. For example, both the external channel and the internal channel can be concentrated in a central area of the roof running longitudinally between the seats of the sports car, so that the roof portions above the head of the occupants of the aforesaid seats are removable or openable. For example, both the external channel and the internal channel can be divided into two parts and concentrated in two longitudinal side areas, each close to the windows of the car, and the central part of the roof, above both seats of the car, is removable or openable.

Advantageously, at least one of the channels, the internal one and/or the external one, can also fulfil a structural function, as it is part of the safety cell of the occupants of the car. Therefore, proper tubular elements made of high-resistance metal alloys or carbon fibres can be used in order to fulfil a double function, namely so as to serve as air conditioning channels and stiffen the structure of the vehicle.

According to a further aspect of the invention, when the inner and/or external channels are made of high-resistance elements, the inner channel crosses the windscreen until it joins the frame of the car, thus defining a central upright. Said central upright identifies a right portion and a left portion of the windscreen. The two windscreen portions, the right one and the left one, preferably are mirror-like relative to one another. This configuration is particularly advantageous because the conditioning system of the cockpit of the car fulfils a very relevant structural function, especially in case of overturning of the vehicle. According to a preferred implementation of this solution, the central upright is internally masked by means of a display, which covers it and reproduces images shot by one or more video cameras externally associated with the upright, so that the presence of the central upright is not perceived by the driver. The video camera/s applied to the upright or to the uprights is/are arranged so as to be aligned with a point of view of the driver. Advantageously, the driver can see, reproduced on the displays, a visual solid angle hidden by the upright, thus loosing the perception of the existence of the upright/s.

According to a further preferred aspect of the invention, when the roof is at least partially removable, the positioning of the conditioning system at the back of the driver's seat leads to the creation of the so-called thermal scarf around the neck of the occupants of the vehicle, so as to keep the neck warm even with the roof partially open or removed.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

In the figures, the same numbers and the same reference letters indicate the same elements or components.

For the purposes of the invention, the term "second" component does not imply the presence of a "first" component. These terms, indeed, are merely used as labels to distinguish the components and should not be interpreted in a limiting manner, provided that the description does not expressively indicates otherwise.

DETAILED DESCRIPTION OF EMBODIMENTS

Figure 1:
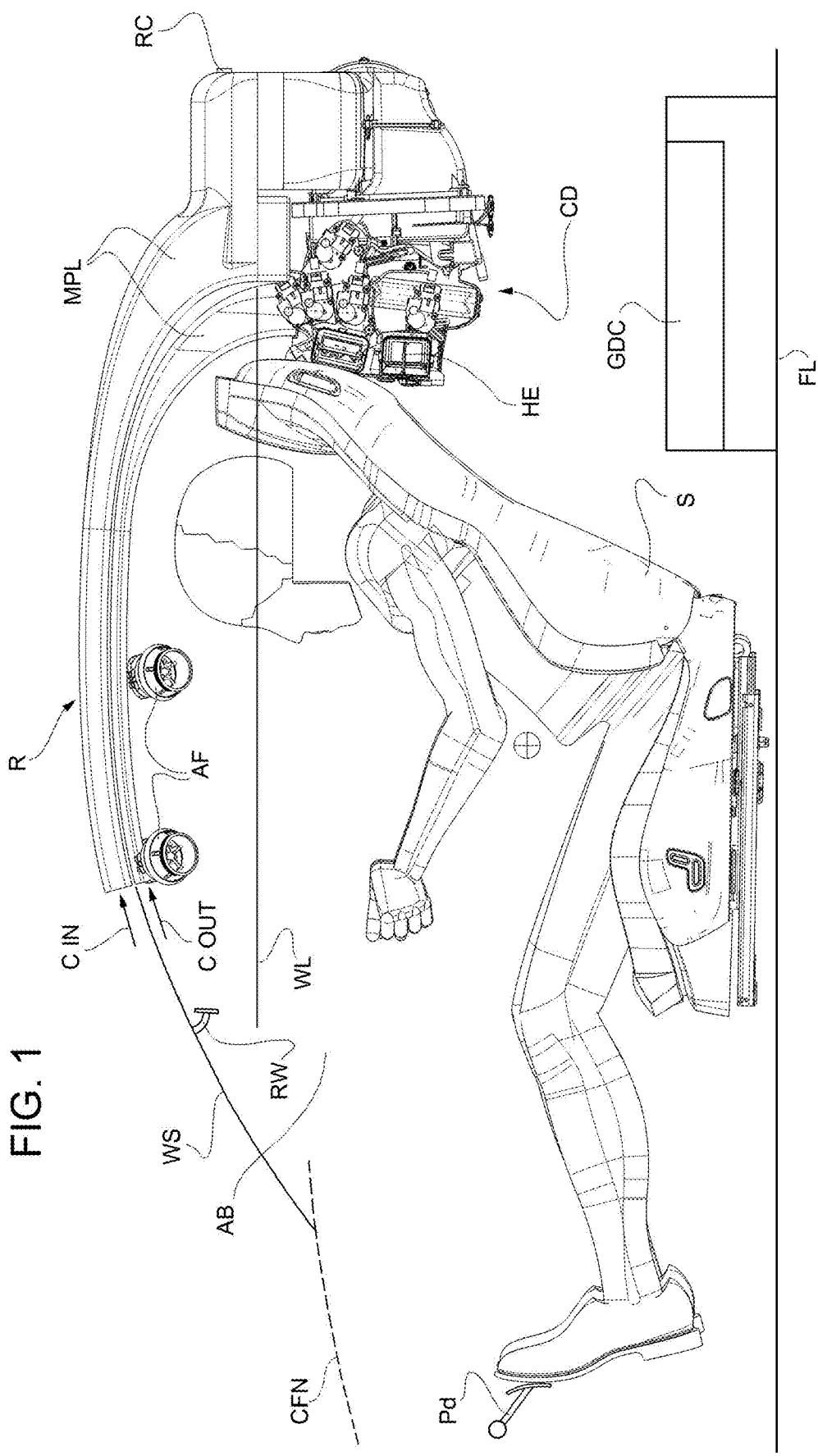
FIG. 1 shows a side view of a portion of a sports car according to a preferred example of the invention.
Figure 2:
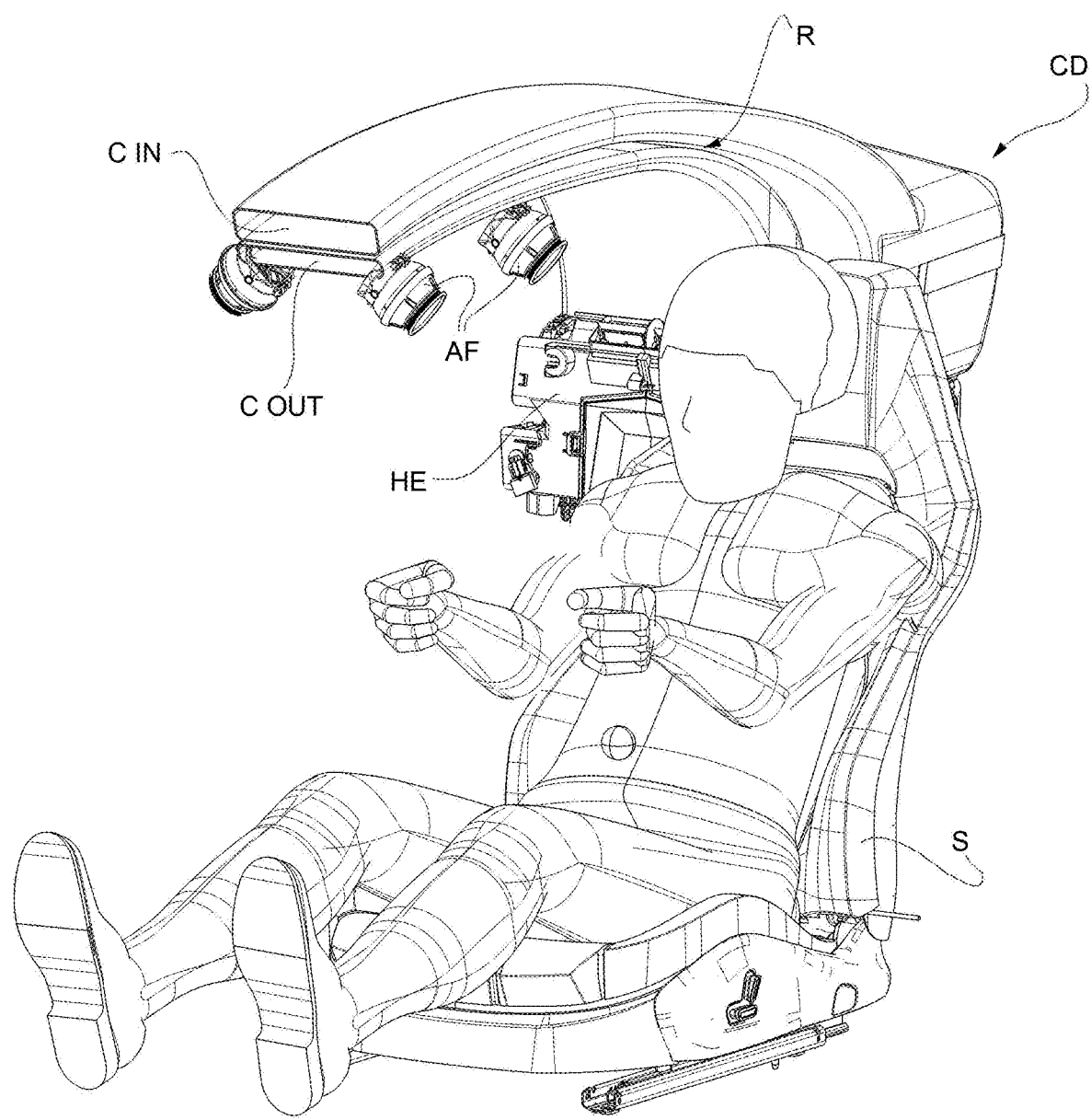
FIG. 2 shows a perspective view of the portion of FIG. 1.

FIGS. 1 and 2 show some parts of a sports car, among which there are a cockpit AB, a seat S and a roof R, according to a preferred example of the invention.

The figures clearly show a lowered seat S, which is typical for sports cars, and a stretched out driving position with the legs and the arms of the driver protruding forward.

The conditioning device CD of the vehicle is arranged at the back of the driver's seat under the line of sight WL, preferably immediately under it.

Therefore, it is lifted from the floor of the vehicle.

Hence, between the floor and the conditioning device there can be installed a battery pack or an internal combustion engine, thus optimizing the distribution of the weights.

Furthermore, as discussed below, this allows the air inflow and outflow ducts to be very short, thus also ensuring a significant effectiveness of the conditioning device.

The roof R of the car is very low and is just above the headrest of the vehicle sear, joining, behind the headrest, the tail of car, which is evidently provided with two "mere" seats.

However, the basic idea of the invention does not change if the car is provided with two small additional seats, in a 2+2 configuration.

Since the roof is joined to the tail of the vehicle, the conditioning device CD is in a position which is approximately tangent to the rear part of the roof.

According to FIG. 1, the line of the front hood CFN is just above the pedals Pd, thanks to the space that was left free by the conditioning device, which was installed at the back of the driver's seat.

According to another preferred variant of the invention, the conditioning device is arranged behind the headrest, namely interferes with the line of sight of the driver. Therefore, the rear-view mirror RW is preferably replaced by a display, which reproduces images captured, in real time, by a backward facing video camera RC. If necessary, the rear window can also be replaced by a display reproducing the same images captured in real time, so that it can realistically take the place of the rear window of the car.

Advantageously, the fact of having the conditioning device very close to the roof allows the cooling of the cockpit to be directly carried out through the roof of the vehicle.

According to a preferred variant of the invention, the conditioned air duct Cout, also called "internal channel", longitudinally runs along the roof, preferably at the centre relative to the development of the car, from the conditioning device CD, forward, toward the windscreen WS, not necessarily up to the windscreen.

In the conditioned air duct Cout there are suitable openings made to spread the conditioned air in the cockpit AB.

Figure 5:
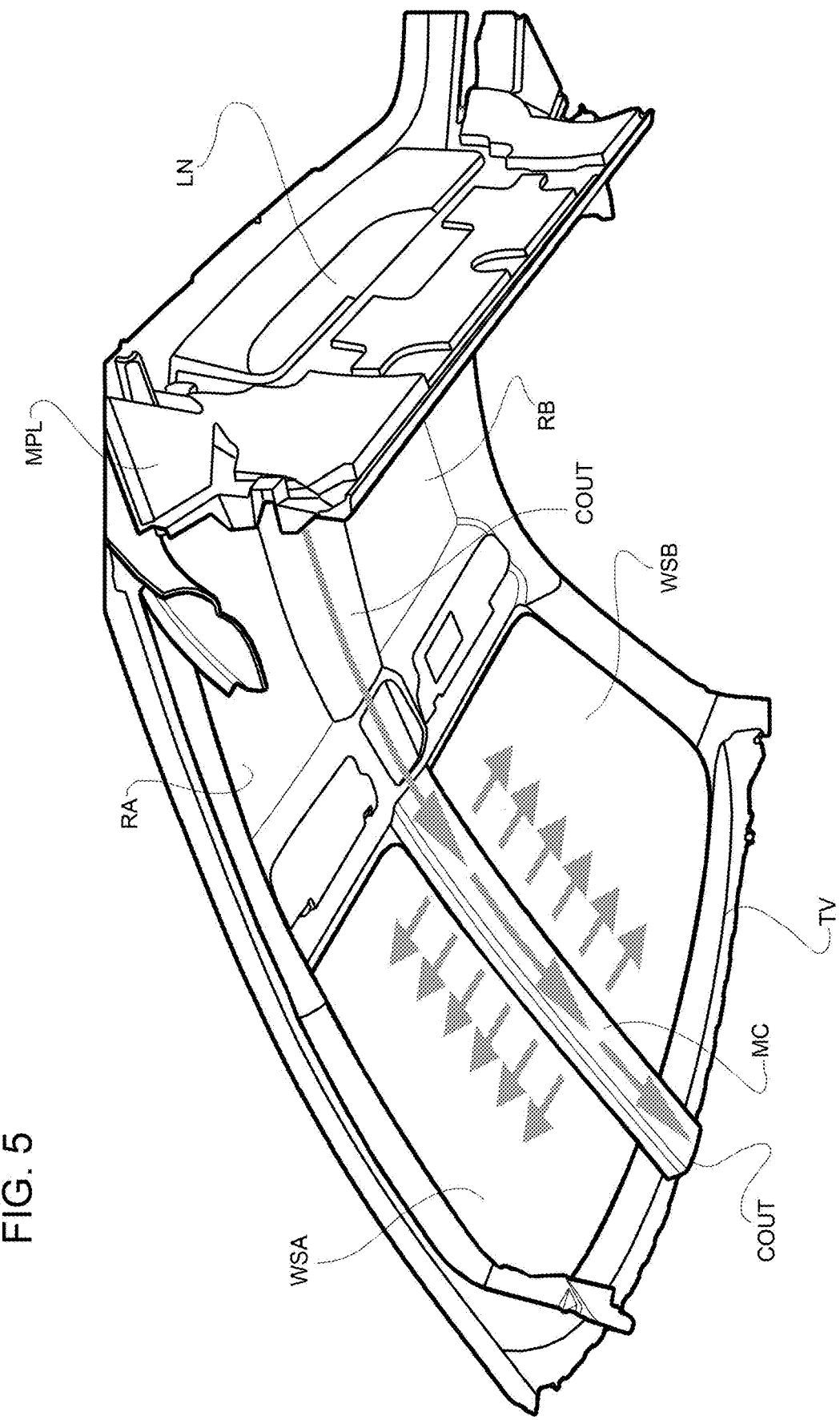
FIG. 5 shows a perspective view from the bottom of a vehicle roof according to one of the examples of FIGS. 3 and 4.

When the car is provided with a rear window LN, see FIG. 5, the air conditioned by the conditioning system CD is channelled in the duct Cout through a rear upright MPL.

On the other hand, if there is no rear window, the duct Cout directly reaches the conditioning device CD in the way shown in FIG. 2, defining a rear central upright.

Advantageously, since the roof R of the cockpit of a sports car is closer to the torso of the occupants than the dashboard, an ideal conditioning of the cockpit is obtained, though keeping the air outflow speed low.

The conditioned air duct Cout is preferably associated with orientable outlets AF, one or more for each one of the two seats of the car.

According to a preferred variant of the invention, said conditioned air duct Cout is made of a high-resistance material and is connected, at the respective ends, to the bearing structure or frame F of the car. In particular, FIG. 5 shows a preferred variant of the invention, in which the conditioned air duct extends forward dividing the windscreen WS into a right portion WSA and a left portion WSB, until it joins the lower crosspiece TV of the bearing structure F.

At the back, the internal and/or external channel can be directly connected to the frame of the car, through the aforesaid rear central upright MPC, or by means of the rear uprights MPL, which usually are more robust and stocky than the front side uprights ML Therefore, in this case, a substantially Y-shaped, high-resistance structure is obtained.

In this way, the portion of internal channel Cout crossing the two windscreen portions defined a central upright MC. The two windscreen portions, the right one and the left one, preferably are mirror-like relative to one another.

Therefore, a portion of the conditioned air flow can be spread through outlets arranged in the dashboard of the vehicle (not shown), which is supplied with conditioned air by the duct Cout.

Adventurously, the duct Cout also fulfils a structural function, as it is part of the safety cell of the occupants of the car, especially in case of overturning of the car. Furthermore, it defines a stiffening of the entire frame, even in case of a front impact.

Hence, said duct Cout fulfils a structural function, since it is integrated in the frame of the vehicle, and a conditioned air conveying and spreading function.

In order to manufacture said duct Cout, suitable tubular elements can be used, which are made of high-resistance metal alloys or of carbon fibre.

Figure 6A:
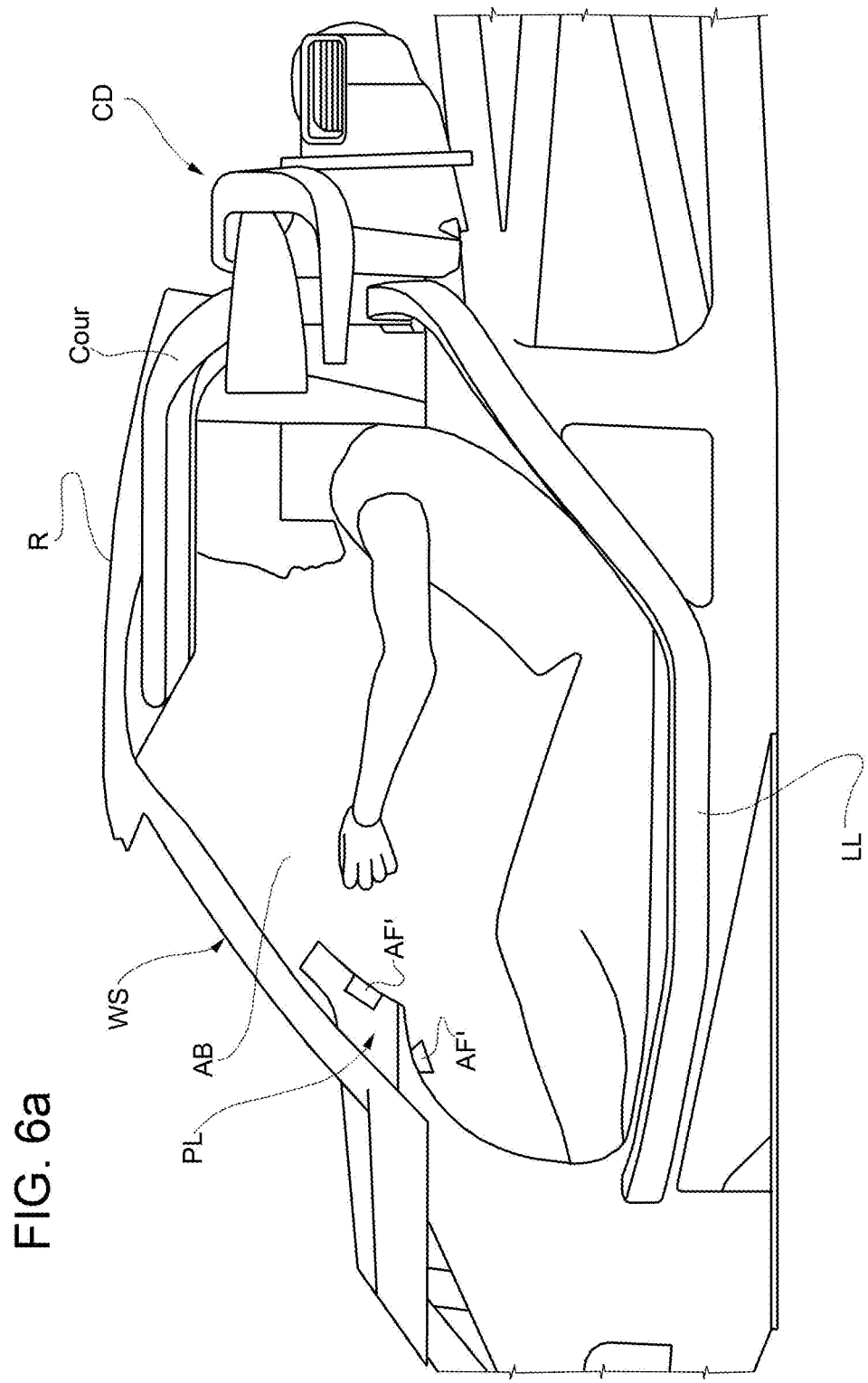
FIGS. 6a and 6b show two same side views, the first one—FIG. 6a—showing a portion of a sports car with removed parts and the second one—FIG. 6b—showing a corresponding part of an example of a conditioning system of the cockpit of the sports car.
Figure 6B:
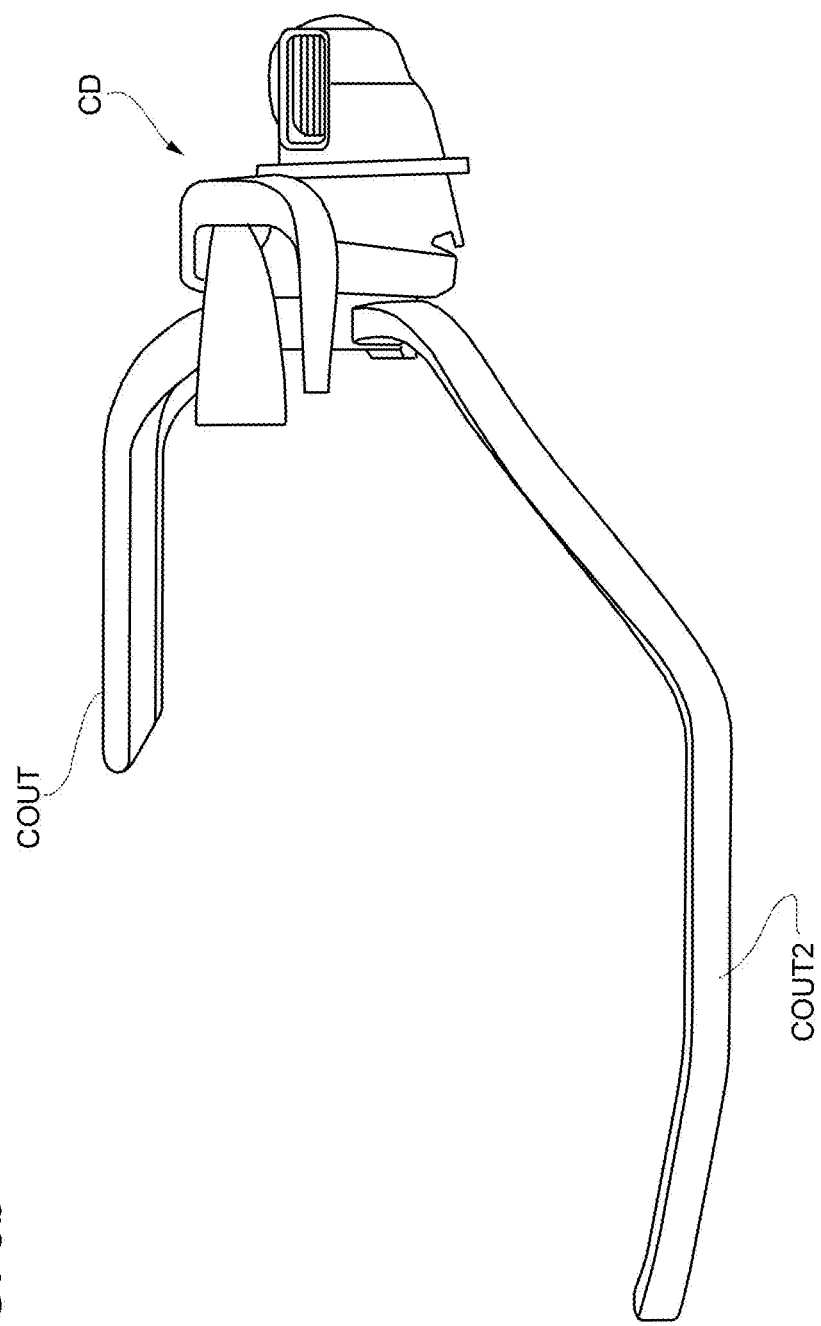
Figure 6C:
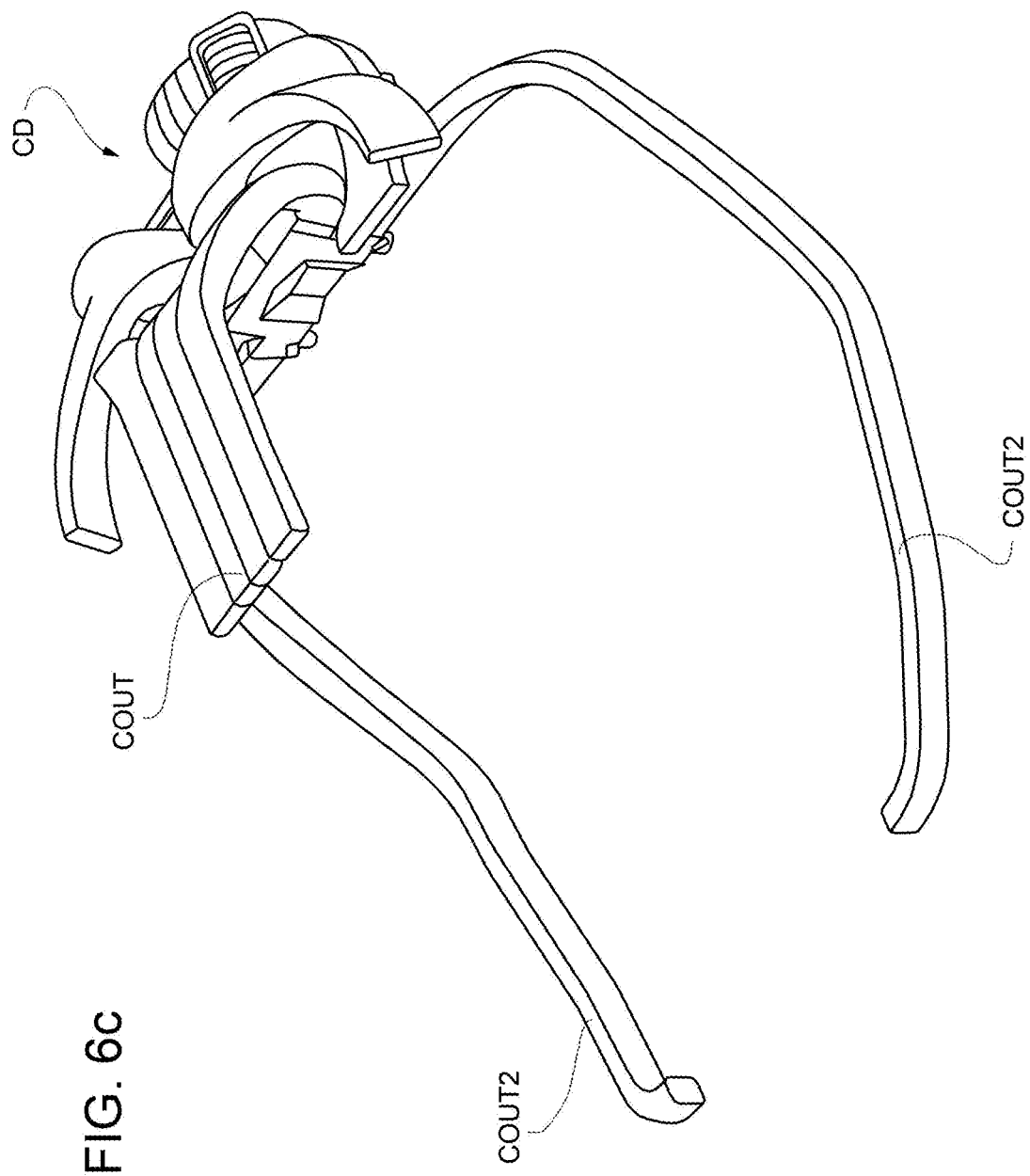
FIG. 6c shows a perspective view of the portion shown in FIG. 6b.

According to another preferred variant of the invention, which can be combined with any other one of the previous variants, FIG. 6a shows a side portion of a cockpit AB of a sports car. On the sides there are side members LL, which surround, on both sides of the car, the lower edges of the access openings of the cockpit AB.

Said side members form, within the frame F of the car, a safety cell for the occupants.

Said side members LL laterally delimit the floor of the cockpit, where the seats S are fixed, and are preferably manufactured with tubular elements made of a high resistance material.

According to a preferred implementation of the invention, these side members also define a portion of the internal channel Cout2, which allows the conditioned air to be conveyed from said conditioning device CD to the legs and/or the dashboard. The dashboard of the car can be provided with aeration outlets to help spread the conditioned air.

This solution is particularly convenient when the portion of the internal channel Cout integrated in the roof R does not cross the windscreen WS.

Nevertheless, this solution can be combined with the one shown in FIG. 5, at least to stiffen the connection of the roof to the lower crosspiece TV.

According to a further preferred variant of the invention, which can be combined with any one of the previous variants, the fresh air flowing into the conditioning system is channelled through one or more external channels, at least one of them having an outward and forward facing opening, so that the circulation of air is natural for the relative forward movement of the sports car. Therefore, a so-called "dynamic air intake" is created, whose flow rate depends, in the absence of any control, on the relative speed between the vehicle and the environmental air.

External channels can be obtained in the body sides of the vehicle immediately behind the access doors SP of the cockpit (indicated in FIGS. 3 and 4).

According to a preferred variant of the invention, an external channel Cin is obtained in the roof, arranged so as to overlap the internal channel Cout.

In addition or alternatively to the internal channel Cout, the external channel Cin arranged on the roof of the car can be made of a high-resistance material so as to fulfil a structural function, becoming part of the frame of the vehicle, and an external air channelling and conveying function. Between the external channel and the conditioning device CD there can be arranged a separation device to separate the air from the water possibly collected while the vehicle travels in the rain.

The fact of moving the conditioning air through the movement of the car in the environment turns out to be extremely advantageous when the car is an electric car. Indeed, a reduction in the aerodynamic efficiency of the vehicle in favour of a natural circulation of the conditioning air of the cockpit is more advantageous than operating an electric fan, especially when the available energy is limited, which is the case in an electric car.

The air flow captured from the outside can preferably be chocked by means of an electrically operated mobile shutter P, which evidently absorbs energy only when it is operated in order to carry out an adjustment. Nevertheless, an electric fan VE is provided in order to ensure a ventilation even when the vehicle is still or travels at a very low speed.

Therefore, according to this preferred variant of the invention, the adjustment of the shutter and the operation of the electric fan VE are coordinated with one another. The fan preferably supplements the dynamic air intake when the latter is approximately completely open.

When the car is stuck in traffic and drives at a very variable speed, the shutter is open in a predetermined intermediate opening position and the electric fan VE is activated in order to keep the air flow spread in the cockpit approximately constant at a predetermined flow value.

Figure 3B:
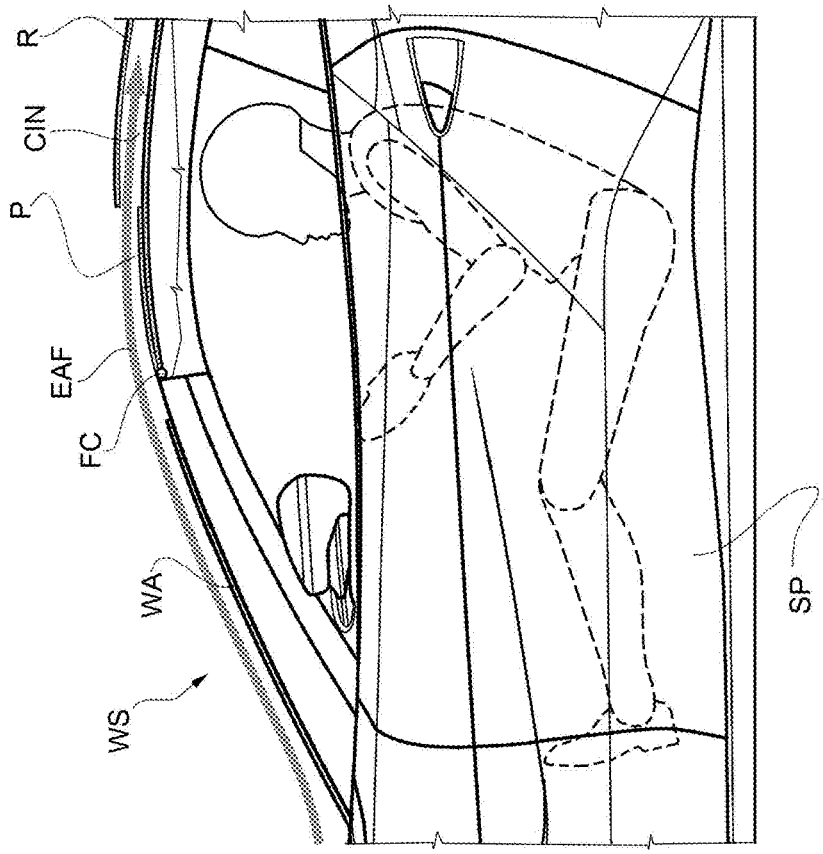
FIGS. 3a and 3b show a side view of a portion of a sports car according to a preferred example of the invention in two different operating conditions.
Figure 3A:
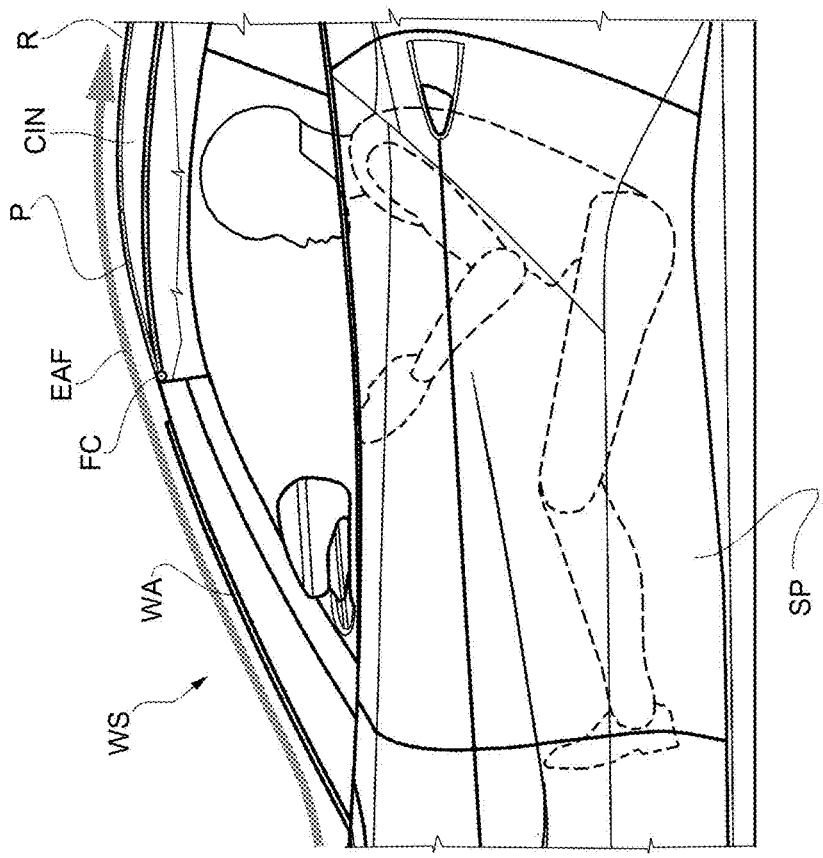

Furthermore, the mobile shutter P can be manufactured so as to optimize the aerodynamic efficiency of the vehicle when the dynamic intake is completely closed. In particular, it can be hinged in a position close to the windscreen WS, mildly joining the windscreen to the outward facing opening of the external channel Cin. FIGS. 3a and 3b show a mobile shutter P or an example of a mobile shutter P in two opposite operating conditions, a completely closed condition and completely open condition, respectively.

Figure 4A:
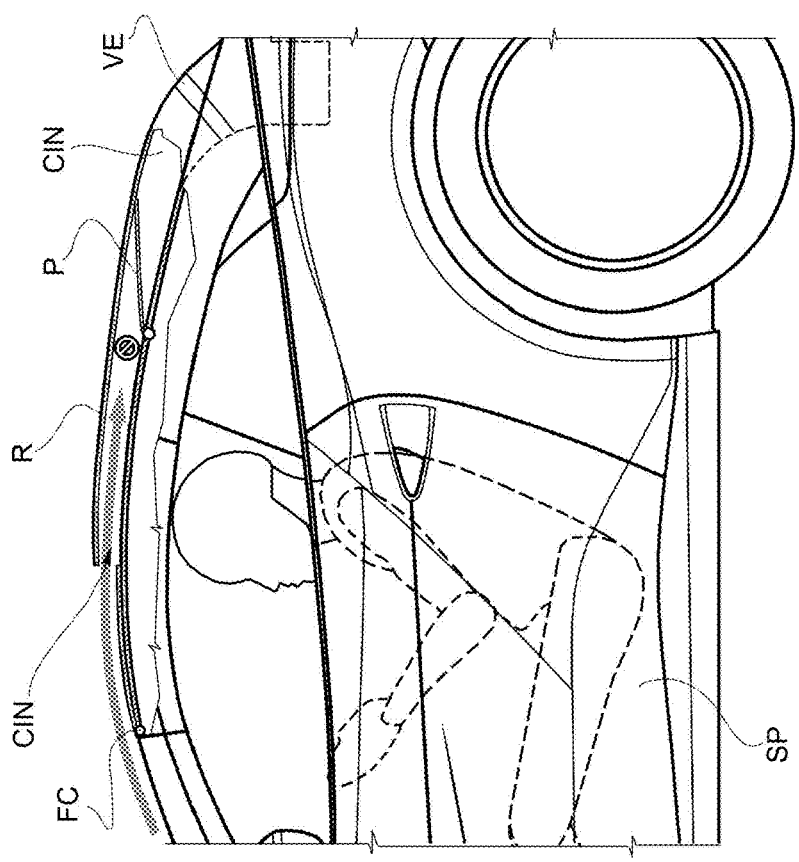
FIGS. 4a and 4b show a side view of a portion of a sports car according to another preferred embodiment of the invention in two different operating conditions.
Figure 4B:
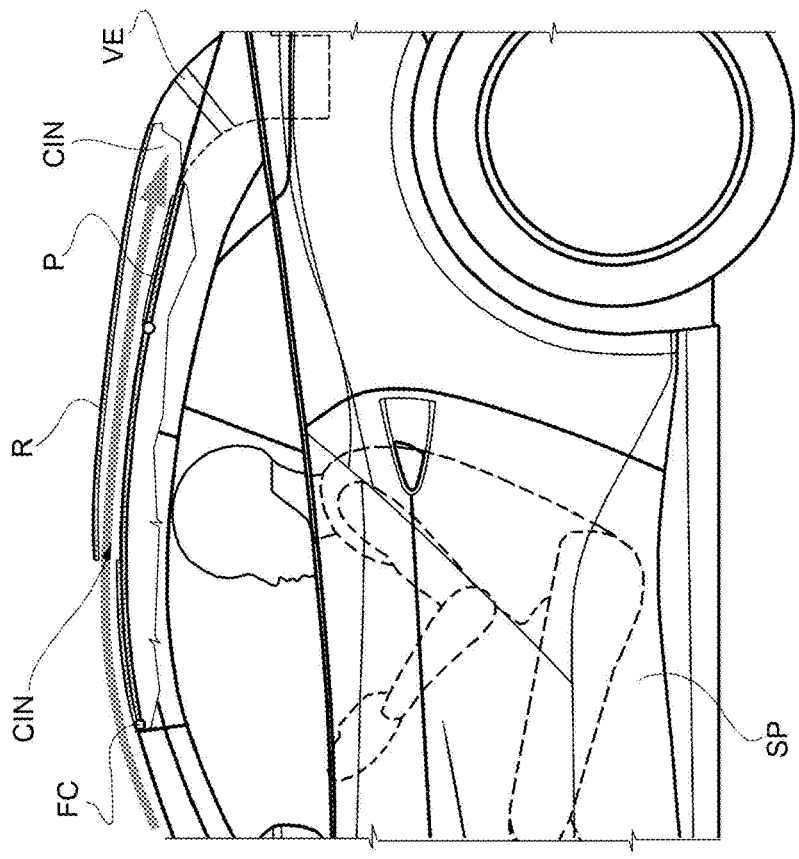

Alternatively, the mobile shutter can be housed inside the external channel Cin, in the way shown in FIGS. 4a and 4b, which show operating conditions corresponding to the ones of FIGS. 3a and 3b.

The air flow EAF determined by the travelling motion of the car, in the first operating condition, slides on the roof R of the car, whereas, in the second operating condition, it is channelled until it reaches the conditioning device CD.

The right portion RA and the left portion RB of the roof R above the heads of the occupants, shown in FIG. 5, can be removed or be folded in the roof in a known manner, preferably independently of one another.

When the internal channel Cout is connected to the lower crosspiece TV, the front central upright MC is internally masked by means of a display, which covers it and reproduces images shot by one or more video cameras FC externally associated with the front central upright, so that the presence of the front central upright is not perceived by the driver.

The video camera/s FC applied to the front central upright MC is/are preferably arranged so as to be perpendicular to the surface of the display internally covering the front central upright.

The front side uprights ML, which delimit the windscreen on the side, also are preferably internally covered with displays connected to as many video camera arranged on the outside of the front side uprights, so that the relative displays reproduce real-time images of what they shoot, masking the existence of the front uprights.

According to a further preferred variant of the invention, at least one windscreen wiper arm (not shown) is arranged so as to wipe the windscreen of the car and is associated with the latter in such a way that, in a rest condition, it is aligned on or beside the central upright MC, so as to have an extremely limited aerodynamic impact.

The non-limiting example described above can be subjected to variations, without for this reason going beyond the scope of protection of the invention, comprising all equivalent embodiments for a person skilled in the art.

When reading the description above, a skilled person can carry out the subject-matter of the invention without introducing further manufacturing details. The elements and features contained in the different preferred embodiments, drawings included, can be combined with one another, without for this reason going beyond the scope of protection of this patent application. The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the invention.

The invention claimed is:

1. A sports car provided with a conditioning system comprising a conditioning device (CD) configured to treat air introduced or recirculated in a vehicle cockpit (AB) of said sports car, an internal channel (Cout) at least partially integral to and underlying a roof (R) overlying the vehicle cockpit configured to deliver conditioned air generated by said conditioning device throughout said vehicle cockpit (AB), and at least one external channel (Cin) overlying the roof (R) for conveying environmental air to said conditioning device (CD), the at least one external channel including a forward and outward facing inlet opening, an outlet opening, and a single fluid passageway fluidly connecting the inlet opening to the outlet opening, wherein the outlet opening is in fluid communication with the conditioning device, wherein said internal channel defines a front central upright (MC), which crosses a windscreen (WS) identifying a right portion (WSA) and a left portion (WSB) of the windscreen, and configured to channel said conditioned air in a vehicle dashboard, and wherein said conditioning device is arranged at a rear position with respect to said vehicle cockpit (AB).

2. The car according to claim 1, wherein said conditioning device (CD) comprises one or more heat exchangers (HE).

3. The car according to claim 1, wherein said conditioning device (CD) is lifted relative to a floor of the sports car.

4. The car according to claim 3, wherein between said floor (F) and said conditioning device (CD) there is interposed a component (GDC) of the car having a greater weight density than said conditioning device.

5. The car according to claim 1, wherein said internal channel is arranged longitudinally to a longitudinal development of the car.

6. The car according to claim 1, wherein said vehicle dashboard comprises aeration openings and/or outlets (AF') arranged for delivering said conditioned air towards an occupants' chest, torso and legs when seated in the sports car, and wherein said vehicle dashboard is supplied by said internal channel crossing said windscreen (WS).

7. The car according to claim 1, wherein said internal channel (Cout) consists of a tubular profile having opposite ends, each of the opposite ends being directly or indirectly connected to a vehicle frame (F) so as to define a reinforcement structure.

8. The car according to claim 7, wherein said internal channel (Cout) is directly connected, at the rear position of the sports car, to said vehicle frame (F).

9. The car according to claim 5, wherein said internal channel (Cout) identifies a right portion (RB) and a left portion (RA) of the roof above heads of the respective seated occupants of the sports car when in use, wherein said left and right portions can be selectively removed and/or folded.

10. The car according to claim 1, wherein said at least one external channel (Cin) comprises an electrically operated mobile shutter (P) configured to adjust said circulation of environmental air through the single fluid passageway.

11. The car according to claim 10, wherein said conditioning device further comprises an electric fan (VE) configured for circulating environmental air through the single fluid passageway even when the sports car is still or travelling at a low speed.

12. The car according to claim 11, wherein an adjustment of said mobile shutter (P) and an operation of said electric fan (VE) are coordinated with one another.

13. The car according to claim 1, wherein said at least one external channel (Cin) is arranged on a vehicle roof (R) longitudinally and centrally to a longitudinal development of the car.

14. The car according to claim 13, wherein said at least one external channel (Cin) cooperates with said roof (R) for defining a reinforcement structure.

15. The car according to claim 14, wherein said at least one external channel (Cin) is directly connected to a vehicle frame to define a rear central upright (MPC).

16. A car according to claim 15, wherein said internal channel is connected to said vehicle frame, at the rear of the sports care, running parallel to said at least one external channel and cooperating in defining said rear central upright (MPC) and so as to define the reinforcement structure in case of a front impact and/or an overturning of the sports car.

17. The car according to claim 1, further comprising at least a windscreen wiper arm (WA), arranged for wiping said windscreen (WS) and wherein said windscreen wiper arm (WA), in a rest position, overlaps or is arranged next to said central upright (MC).

* * * * *